US010371541B2

(12) United States Patent
Voronel

(10) Patent No.: US 10,371,541 B2
(45) Date of Patent: *Aug. 6, 2019

(54) USING GEOGRAPHIC FAMILIARITY TO GENERATE NAVIGATION DIRECTIONS

(71) Applicant: MICROSOFT TECHNOLOGY LICENSING, LLC, Redmond, WA (US)

(72) Inventor: Gary A. Voronel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,174

(22) Filed: Apr. 7, 2017

(65) Prior Publication Data

US 2017/0211944 A1 Jul. 27, 2017

Related U.S. Application Data

(63) Continuation of application No. 14/230,244, filed on Mar. 31, 2014, now Pat. No. 9,619,523.

(51) Int. Cl.
*G06F 16/00* (2019.01)
*G01C 21/34* (2006.01)
(Continued)

(52) U.S. Cl.
CPC ....... *G01C 21/3484* (2013.01); *G01C 21/367* (2013.01); *G01C 21/3676* (2013.01);
(Continued)

(58) Field of Classification Search
CPC .............. G06Q 10/00; G06Q 30/0261; G01C 21/3641; G06F 17/3053; G06F 17/30061
(Continued)

(56) References Cited

U.S. PATENT DOCUMENTS 7,480,567 B2 * 1/2009 Suomela ............ G01C 21/3641
340/990
7,603,360 B2 10/2009 Ramer et al.
(Continued)

FOREIGN PATENT DOCUMENTS

EP 1646037 A2 4/2006
EP 1939797 A1 7/2008
(Continued)

OTHER PUBLICATIONS

Driver, et al., "Hermes: Generic Designs for Mobile, Context-Aware Trails-Based Applications", In Proceedings of Workshop on Context Awareness. 2nd International Conference on Mobile Systems, Applications, and Services, Jun. 6, 2004, 5 pages.
(Continued)

*Primary Examiner* — Hanh B Thai
(74) *Attorney, Agent, or Firm* — Shook, Hardy & Bacon LLP

(57) ABSTRACT

Aspects of the present invention customize services, including search results, that are customized based on the user's familiarity with a geographic area. The search results may be customized by including different information in a search result, emphasizing different information in a search result, adjusting a relevance rank of different search results, and such. The search results may be customized based on the understanding that a user's familiarity with a particular area may influence the type of information that can be useful to the user. Different levels of familiarity may cause different types and levels of search result customization to be performed.

20 Claims, 8 Drawing Sheets

(51) Int. Cl.
   *G06F 16/44*     (2019.01)
   *G06F 16/9537*   (2019.01)
   *G06F 16/2457*   (2019.01)
   *G01C 21/36*     (2006.01)
   *H04L 29/08*     (2006.01)

(52) U.S. Cl.
   CPC ... *G01C 21/3679* (2013.01); *G06F 16/24578* (2019.01); *G06F 16/444* (2019.01); *G06F 16/9537* (2019.01); *H04L 67/18* (2013.01)

(58) Field of Classification Search
   USPC .......................................... 707/706, 728–729
   See application file for complete search history.

(56) References Cited

U.S. PATENT DOCUMENTS

| | | | |
|---|---|---|---|
| 7,761,350 | B1 | 7/2010 | Ridgeway |
| 7,818,315 | B2 | 10/2010 | Cucerzan et al. |
| 7,822,751 | B2 | 10/2010 | O'Clair et al. |
| 8,135,505 | B2 | 3/2012 | Vengroff et al. |
| 8,239,266 | B1 | 8/2012 | Charaniya et al. |
| 8,438,156 | B2 | 5/2013 | Redstone et al. |
| 8,880,607 | B1* | 11/2014 | Merom .................. G06Q 10/10 705/319 |
| 8,886,645 | B2 | 11/2014 | Jones et al. |
| 8,954,860 | B1 | 2/2015 | Hands et al. |
| 8,977,649 | B1* | 3/2015 | Hassidim .......... G06F 17/30958 705/319 |
| 9,194,716 | B1 | 11/2015 | Cutter |
| 9,262,481 | B1* | 2/2016 | Le ......................... G06Q 50/01 |
| 9,329,759 | B1 | 5/2016 | Hill |
| 9,423,265 | B2* | 8/2016 | Suomela ............ G01C 21/3641 |
| 9,582,546 | B2* | 2/2017 | Hartford ........... G06F 16/24578 |
| 9,719,791 | B2* | 8/2017 | Hall ................... G06Q 30/0261 |
| 2005/0144574 | A1 | 6/2005 | Chang |
| 2006/0022048 | A1 | 2/2006 | Johnson |
| 2006/0069503 | A1* | 3/2006 | Suomela ............ G01C 21/3641 701/431 |
| 2006/0212423 | A1 | 9/2006 | Jones et al. |
| 2006/0271281 | A1 | 11/2006 | Ahn et al. |
| 2007/0038755 | A1 | 2/2007 | Sullivan et al. |
| 2007/0260599 | A1 | 11/2007 | McGuire et al. |
| 2008/0088886 | A1 | 4/2008 | Silverbrook et al. |
| 2008/0189249 | A1 | 8/2008 | Petakov et al. |
| 2008/0222119 | A1 | 9/2008 | Dai et al. |
| 2008/0228947 | A1 | 9/2008 | Markus et al. |
| 2008/0248815 | A1 | 10/2008 | Busch |
| 2008/0270038 | A1 | 10/2008 | Partovi et al. |
| 2008/0288165 | A1* | 11/2008 | Suomela ............ G01C 21/3641 701/533 |
| 2009/0281726 | A1 | 11/2009 | Byrne et al. |
| 2010/0036806 | A1 | 2/2010 | Lam et al. |
| 2010/0042619 | A1 | 2/2010 | Jones et al. |
| 2010/0241507 | A1 | 9/2010 | Quinn et al. |
| 2011/0082846 | A1 | 4/2011 | Bamba et al. |
| 2011/0137881 | A1 | 6/2011 | Cheng et al. |
| 2011/0184936 | A1 | 7/2011 | Lymberopoulos et al. |
| 2011/0246469 | A1 | 10/2011 | Yarvis et al. |
| 2011/0252108 | A1* | 10/2011 | Morris ..................... H04L 51/32 709/206 |
| 2011/0313657 | A1 | 12/2011 | Myllymaki et al. |
| 2012/0089617 | A1 | 4/2012 | Frey |
| 2012/0123806 | A1* | 5/2012 | Schumann, Jr. ........ G06Q 40/08 705/4 |
| 2012/0276923 | A1 | 11/2012 | Bamba et al. |
| 2013/0085857 | A1 | 4/2013 | Bax et al. |
| 2013/0191458 | A1 | 7/2013 | Krishnan et al. |
| 2013/0198159 | A1 | 8/2013 | Hendry |
| 2013/0225202 | A1* | 8/2013 | Shim ..................... G06F 16/245 455/456.3 |
| 2013/0254227 | A1* | 9/2013 | Shim ..................... G06F 16/245 707/769 |
| 2013/0267253 | A1 | 10/2013 | Case et al. |
| 2013/0332070 | A1 | 12/2013 | Fleizach et al. |
| 2014/0040759 | A1 | 2/2014 | Okubo et al. |
| 2014/0052718 | A1* | 2/2014 | Waupotitsch ..... G06F 17/30867 707/728 |
| 2014/0099978 | A1 | 4/2014 | Egner et al. |
| 2014/0143004 | A1 | 5/2014 | Abhyanker |
| 2014/0222912 | A1* | 8/2014 | St. Clair .................. H04L 67/22 709/204 |
| 2014/0244665 | A1* | 8/2014 | Hartford ........... G06F 16/24578 707/749 |
| 2014/0279861 | A1* | 9/2014 | Stonelake .............. G06Q 50/01 707/609 |
| 2015/0031396 | A1* | 1/2015 | Hartford ................. H04W 4/02 455/456.3 |
| 2015/0045068 | A1* | 2/2015 | Soffer ..................... G01C 21/20 455/456.3 |
| 2015/0100237 | A1 | 4/2015 | Zhao et al. |
| 2015/0169630 | A1* | 6/2015 | Shynar ............... G06F 16/9537 707/769 |
| 2015/0262232 | A1 | 9/2015 | Klein et al. |
| 2016/0169695 | A1* | 6/2016 | Hall .................... G06Q 30/0261 701/426 |

FOREIGN PATENT DOCUMENTS

| | | |
|---|---|---|
| EP | 1952279 A1 | 8/2008 |
| WO | 2009146087 A1 | 12/2009 |

OTHER PUBLICATIONS

Schwinger, et al., "Context-awareness in Mobile Tourism Guides—A Comprehensive Survey", In Technical Report, Jul. 2005, 20 pages.
Zheng, et al., "Recommending Friends and Locations Based on Individual Location History", In Proceedings of ACM Transactions Asian Language Information Processing, vol. 6, No. 3, Nov. 2007, 47 pages.
Lowensohn, Josh, "Bing Now Taps user Location, History for Relevance", published Feb. 10, 2011, http://news.cnet.com/8301-10805.sub.--3-20031462-75.html, 3 pages.
Yoon, et al., "Social Itinerary Recommendation from User-Generated Digital Trails", In Journal of Personal and Ubiquitous Computing, vol. 16, Issue 5, Jun. 11, 2011, 15 pages.
"Location-Based Service", Retrieved from << https://en.wikipedia.org/w/index.php?title=Location-based.sub.—s-erviceoldid=601888780, Mar. 29, 2014, 10 Pages.

\* cited by examiner

USING GEOGRAPHIC FAMILIARITY TO GENERATE NAVIGATION DIRECTIONS

CROSS-REFERENCE TO RELATED APPLICATIONS

This application is a continuation of U.S. application Ser. No. 14/230,244, filed Mar. 31, 2014, entitled "Using Geographic Familiarity To Generate Search Results," which is herein incorporated by reference in its entirety.

BACKGROUND

Users are able to locate relevant websites and other content using a search engine. There are different types of searches. Some searches seek a particular answer to a question (e.g., what is the largest city in Kansas?) and other searches seek to learn about a topic (e.g., how does a space elevator work?). Some searches may want an entertainment suggestion, such as nearby restaurants or movie theaters. Some search engines may take the user's present location into account when determining a result's relevance to the user. Other search engines may take geographic information indicated within the query into account when determining a result's relevance.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention customize services, including search results, based on the user's familiarity with a geographic area. The search results may be customized by including different information in a search result, emphasizing different information in a search result, adjusting a relevance rank of different search results, and such. The search results may be customized based on the understanding that a user's familiarity with a particular area may influence the type of information that can be useful to the user. Different levels of familiarity may cause different types and levels of search result customization to be performed.

A user's familiarity level with the area of interest can be determined for the user who submitted a query by analyzing the user's location data. The user's familiarity may be defined using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels.

The area-customized search results may be customized based on the user's familiarity level with an area associated with a group of search results or on a search result-by-search result basis. Area-customized search results can take several different forms. In one aspect, the search results themselves include a standard, non-customized format but are re-ranked and presented in an order that is area-customized. In another aspect, the search results themselves are modified based on a user's familiarity with an area. In various aspects, the area-customized search results can be both individually customized to include the information that is most relevant given the user's familiarity and re-ranked based on relevance.

The area-customized search results can modify a single result but could also modify the layout or information included in a search results page. For example, if a particular search result is presented with a map by default, then the map may be omitted from the search results page when the area of interest associated with the search input is an area the user has a high level of familiarity with. This allows for better use of the limited real estate on the search results page.

BRIEF DESCRIPTION OF THE DRAWINGS

Aspects of the invention are described in detail below with reference to the attached drawing figures, wherein.

DETAILED DESCRIPTION

Figure 1:
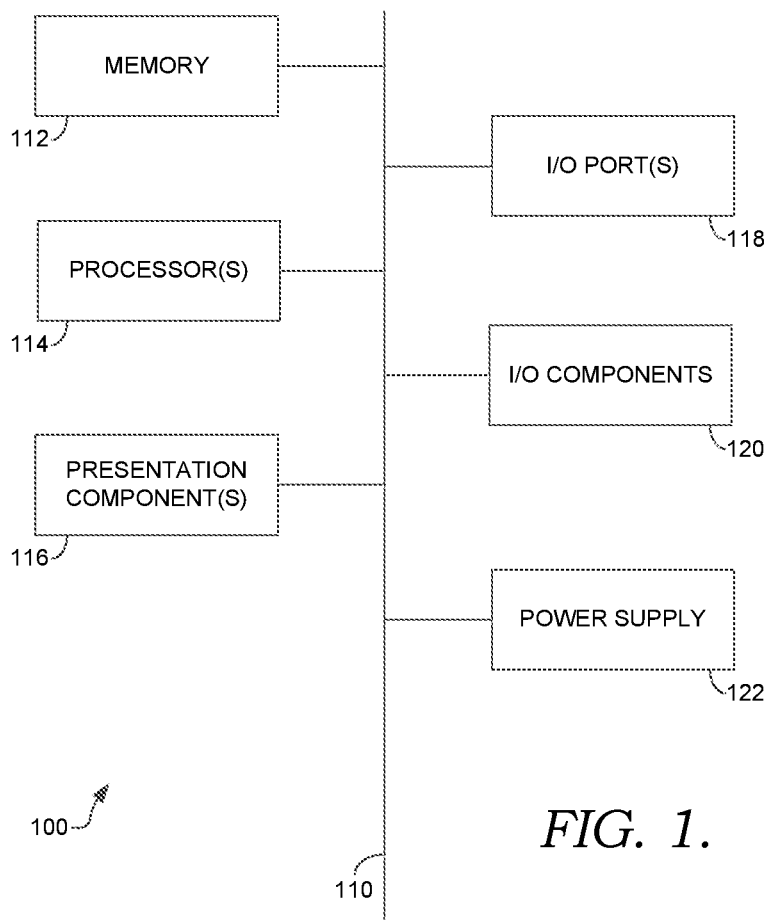
FIG. 1 is a block diagram of an exemplary computing environment suitable for implementing aspects of the present invention.

The subject matter of aspects of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention customize services, including search results, that are customized based on the user's familiarity with a geographic area. The search results may be customized by including different information in a search result, emphasizing different information in a search result, adjusting a relevance rank of different search results, and such. The search results may be customized based on the understanding that a user's familiarity with a particular area may influence the type of information that can be useful to the user.

Some search inputs can be explicitly or implicitly associated with a geographic area of interest. When an area of interest is detected, then the area of interest can be compared with the user's familiarity level with the area of interest. Aspects of the present invention may define an area of interest according to different parameters. In one aspect, a geographic area may first be divided into a plurality of zones. In such an aspect, a city could be divided into a plurality of geographic zones based on size. For example, the city could be divided into square zones that are about a half square mile each, one square mile, two square miles, and such. Alternatively or additionally, the plurality of zones can include different points of interest, including entertainment or shopping districts. The zones based on points of interest may have a variable size and shape. For example, the zone for a shopping mall can include the mall proper and the surrounding area. The surrounding area may be editorially determined to encompass an area that a person is likely to associate with a mall area. Alternatively, the surrounding area may be derived by analyzing location data derived from multiple users over time to generate a location "hot spot" around the mall. A similar method could be used for any point of interest. In one aspect, the geographic zones and point of interest zones can overlap. Thus, multiple zones may be combined to form the "area of interest" associated with the search input.

As an alternative to the zones described above, an area of interest could be a city, town, neighborhood, point of interest, or other similar area. When a specific location is given in the search input, for example, the name of a restaurant having a known location, then the area of interest can be limited to the restaurant.

In one aspect, the area of interest is determined by first evaluating the search input for location information. If no location information is detected, then the computing device's present location can be used to establish the area of interest. Location information can be explicit or implicitly derived. Explicit location information includes the name of a city, park, neighborhood, or other known geographic entity. Implicit location information includes the name of a uniquely identifiable entity that is associated with location information. For example, the name of a restaurant having only one location (or one location within a designated distance from the user, such as 50 miles) can be implicit location information because the address of the restaurant can be used to establish the area of interest. Upon determining that the search input does not explicitly or implicitly include location information, the present location of the computing device through which the search input is submitted may be used to assign an area of interest.

The user's familiarity may be defined using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels. The user's familiarity with different zones can be stored in a location profile.

As mentioned, the user location profile may be built by analyzing user location data. The user location data describes locations the user has been in the past. The user location data may be gathered by one or more location enabled devices. Location enabled devices can include the user's GPS-enabled device, such as a smartphone. Other methods of gathering a user's user location data may be used in combination with or instead of information provided by a location enabled device.

Additional user location data includes the user's or others' social posts. For example, a user could be tagged in a post that is associated with an entity having a known location, such as a concert venue. The social posts may include the name of a restaurant or other business having a known location.

An additional type of location data is the user's profile or profiles. For example, a user's profile on a social network may include designations of one or more cities in which the user has lived. A user profile may include a home address, work address, or other information provided when registering a device or subscribing to a service. A specific location profile may be built for the user by asking the user to provide locations where the user has different levels of familiarity. The user may be quizzed by a personal assistant that is able to provide or help provide the user's familiarity level with different areas of interest.

When determining a user's familiarity level with a zone, the different location information may be given different weight. For example, social posts may be given less weight than the user's answer to a query about familiarity. A user's social posts may be given more weight than others' social posts.

The area-customized search results may be customized based on the user's familiarity level with an area associated with a group of search results or on a search result-by-search result basis. Area-customized search results can take several different forms. In one aspect, the search results themselves include a standard, non-customized format but are re-ranked and presented in an order that is area-customized. In another aspect, the search results themselves are modified based on a user's familiarity with an area. In various aspects, the area-customized search results can be both individually customized to include the information that is most relevant given the user's familiarity and re-ranked based on relevance.

The area-customized search results can modify a single result but could also modify the layout or information included in a search results page. For example, if a particular search result is presented with a map by default, then the map may be omitted from the search results page when the area of interest associated with the search input is an area the user has a high level of familiarity with. This allows for better use of the limited real estate on the search results page.

Area-customized search results may be obtained for numerous types of search queries. A non-limiting list of other types of search queries can include queries for local attractions or events, retail shopping, directions/navigation, hiking trails, and traveling. For example, in one aspect, when a user is searching for directions to their home from an unfamiliar area (e.g., the user has a low familiarity level with their present location), the directions may include detailed directions to get the user on a highway that leads to their house and may not include detailed directions or any directions from that highway to their home, as the user is intimately familiar with getting from the highway to their home. In another aspect, the search results of a search query related to retail shopping, e.g., clothing boutiques, may be customized such that when a user has a high level of familiarity with the area of interest, the top search results include new clothing boutiques or boutiques having a sale. Whereas, that same clothing boutique search query may result in customized search results where the top results include popular clothing boutiques or boutiques owned by a well-known designer if the user has a low familiarity level with the area of interest. Similarly, in one aspect, a search for attractions or events may be customized to give top ranking to the most popular attractions for a user that has a low familiarity level with the area of interest, while the same search may be customized to give a top rank to an upcoming concert by a local band when the user has a high familiarity level with the area of interest.

In aspects, the area-customized search results may include additional related content that is relevant to the search results, where the additional related content may be different for users having different familiarity levels with the area of interest. For example, in one aspect, a search query for attractions or events in an area of interest that a user has a low familiarity level with may include additional content relating to hotels if such an event or attraction is in an area that is a day's drive or more from the user's home or present location. Whereas, if the user has a high familiarity level with the area of interest, such hotel information may not necessarily be provided. In the same or alternative aspects, the additional related content may include information on sales or coupons, or news related to an entity corresponding to the search query and/or search results.

In aspects, customizing search results based on a user's familiarity with the area of interest may be combined with one or more additional ranking algorithms, such as ranking algorithms based on a user's preferences, web browsing history, or online shopping history. For example, in one aspect, search results for the search query "restaurants" can be customized based on the user's familiarity level with the area of interest and based on a user's preferences, which may include any dietary restrictions the user has.

Having briefly described an overview of aspects of the invention, an exemplary operating environment suitable for use in implementing aspects of the invention is described below.

Exemplary Operating Environment

Referring to the drawings in general, and initially to FIG. 1 in particular, an exemplary operating environment for implementing aspects of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art and reiterate that the diagram of FIG. 1 is merely illustrative of an exemplary computing device that can be used in connection with one or more aspects of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disk drives, etc. Computing device 100 includes one or more processors 114 that read data from various entities, such as bus 110, memory 112, or I/O components 120. Presentation component(s) 116 present data indications to a person or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
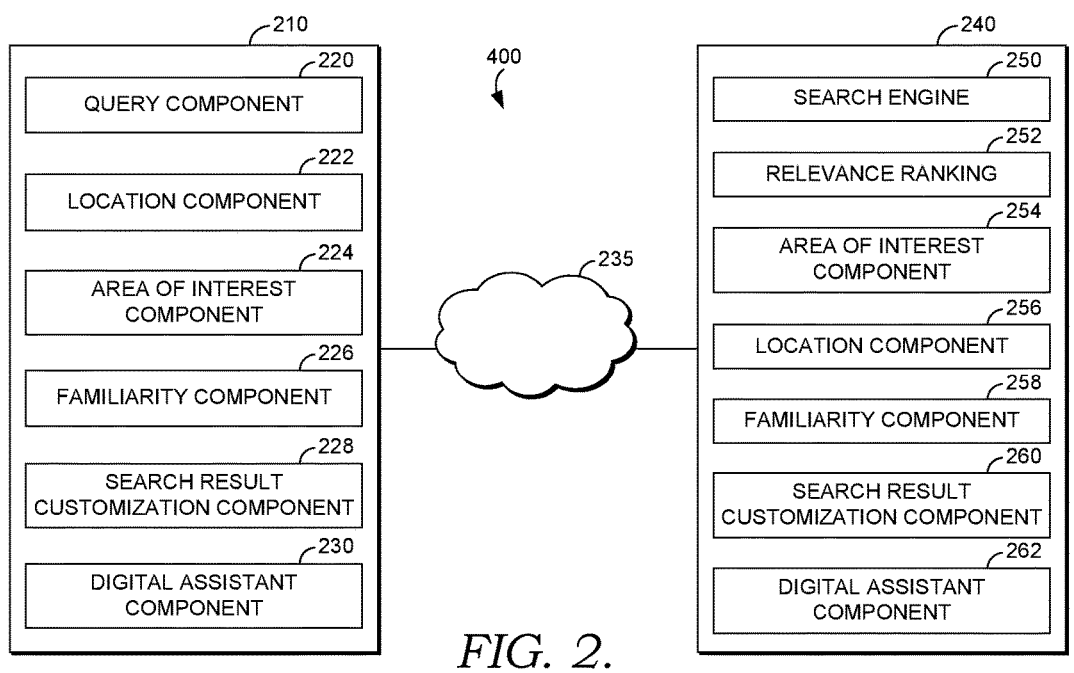
FIG. 2 is a block diagram of an exemplary computing environment for implementing aspects of the present invention that includes a user's computing device and a server, which are in communication with one another via a wide area network.

Turning now to FIG. 2, an exemplary computing environment 200 is depicted in accordance with one aspect of the present invention. The computing environment 200 includes a user's computing device 210 and a server 240, which are in communication with one another via a wide area network 235, such as the Internet. The computing device 210 can be similar to the computing device 100 described above with reference to FIG. 1. The computing device 210 can include a query component 220, a location component 222, an area of interest component 224, a familiarity component 226, a search result customization component 228, and a digital assistant component 230.

In aspects, the query component 220 can receive a query or search input from a user. The search input may comprise one or more alphanumeric characters forming part of a word, an entire word, or a series of words. The search input may be submitted to the user's computing device 210 in the form of keystrokes on a keyboard, handwritten input, or voice input. The handwritten input may be provided through a touchscreen interface or other suitable surface capable of digitizing handwriting into an input of the user's computing device 210. The voice input may be received through a microphone associated with the computing device 210 and converted to text for use as a computing input. In each of the examples below, the search input is initially submitted through a user device.

The location component 222 of the user's computing device 210 can determine and store the location data of the computing device 210. In aspects, the computing device 210 can be a GPS-enabled device. A GPS-enabled device can track its own location and keep a record of locations visited. In addition to GPS, the computing device 210 may ascertain its location using Wi-Fi hot spots, cell towers, and other methods.

The location component 222 may also collect a user's location information in the form of a history of network connection points accessed by the user's computing device 210. Network access points can include Wi-Fi hot spots, cell towers, and other wired or wireless connection points having a known location. The access point may be identified through an IP address associated with the component. The IP address can be associated with a geographic area that is then included within the user's location data.

The area of interest component 224 of the computing device 210 can determine the area of interest associated with the search input. The area of interest component 224 may first divide a geographic area into a plurality of zones. Alternatively or additionally, the plurality of zones can include different points of interest, including entertainment or shopping districts. The zones based on points of interest may have a variable size and shape. For example, the zone for a shopping mall can include the mall proper and the surrounding area. The surrounding area may be editorially determined to encompass an area that a person is likely to associate with a mall area. Alternatively, the surrounding area may be derived by analyzing location data derived from multiple users over time to generate a location "hot spot" around the mall. A similar method could be used for any point of interest. In one aspect, the geographic zones and point of interest zones can overlap. Thus, multiple zones may be combined to form the "area of interest" associated with the search input.

As an alternative to the zones described above, an area of interest could be a city, town, neighborhood, point of interest, or other similar area. When a specific location is given in the search input, for example, the name of a restaurant having a known location, then the area of interest can be limited to the restaurant.

In an aspect, the area of interest component 224 derives the area of interest from terms included within the search query. For example, a search input may recite, "restaurants in Leawood, Kans." In this case, the area of interest may be designated as Leawood, Kans., and include all zones associated with Leawood, Kans. Alternatively, the area of interest can include one or more zones touching a circle with a center point at the location of the computing device 210 through which the search input was submitted and a radius that extends a threshold distance (e.g., two miles, five miles) from the center. Alternatively, the area of interest can be the zone or zones in which the user's computing device 210 is located.

In one aspect, the area of interest component 224 determines the area of interest by first evaluating the search input for location information. If no location information is detected, then the present location of the computing device 210 can be used to establish the area of interest. Location information can be explicit or implicitly derived. Explicit location information includes the name of a city, park, neighborhood, or other known geographic entity. Implicit location information includes the name of a uniquely identifiable entity that is associated with location information. If the area of interest component 224 determines that the search input does not explicitly or implicitly include location information, the area of interest component 224 can assign the present location of the computing device 210 through which the search input is submitted as the area of interest.

The familiarity component 226 can determine the user's familiarity level with respect to the area of interest. In aspects, the familiarity component 226 can include a user's location profile, which can be used to retrieve the user's familiarity level therefrom. The location profile may be generated on the computing device 210, via the familiarity component 226, by evaluating explicit user inputs and by analyzing the user's location data. The familiarity component 226 can store the user's familiarity level with one or more zones, as described above. The zones can be geographic in nature and/or based on points of interest.

In certain aspects, the familiarity component 226 does not require the use of predefined zones when determining a user's familiarity level. For example, the familiarity component 226 can build the familiarity level as a "heat map." "Hot" areas are those where the user visits frequently and "cold" areas are visited infrequently. In this case, the familiarity component 226 compares the area of interest, whether defined as a zone or not, to the heat map to determine the user's familiarity with the area of interest.

The familiarity component 226 may define a user's familiarity by using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels.

As an alternative to retrieving the familiarity level from the user's location profile, the familiarity component 226 can determine a user's familiarity level with an area of interest at run time by analyzing available user location data, e.g., location data determined from the location component 222.

The familiarity component 226 may analyze location data provided by location component 220. The familiarity component 226 may also gather additional location data to determine a familiarity level. For example, the familiarity component 226 may also gather user location data obtained from the user's or others' social posts. For example, a user could be tagged in a post that is associated with an entity having a known location, such as a concert venue. The social posts may include the name of a restaurant or other business having a known location.

The familiarity component 226 can also gather location data obtained from user profiles. For example, a user's profile on a social network may include designations of one or more cities in which the user has lived. A user profile may include a home address, work address, or other information provided when registering a device or subscribing to a service.

The search result customization component 228 customizes the search results based on the user's familiarity level with the area of interest. Area-customized search results can take several different forms. In one aspect, the search results themselves include a standard, non-customized format but are re-ranked by the search result customization component 228 in an order that is area-customized.

In another aspect, the search result customization component 228 modifies the search results themselves based on a user's familiarity with an area. For example, a search result within an area with which the user has a high level of familiarity may not include navigation information. Instead, dinner specials or new menu items for a restaurant that is the subject of a search result are surfaced.

In aspects, the search result customization component 228 can both individually customize the search results to include the information that is most relevant given the user's familiarity and re-rank the search results based on relevance.

The search result customization component 228 can modify a single result but could also modify the layout or information included in a search results page. For example, if a particular search result is presented with a map by default, then the map may be omitted from the search results page when the area of interest associated with the search input is an area the users has a high level of familiarity with.

In one aspect, the search result customization component 228 may customize different categories of searches in different ways. Categories where the user may be assumed to have a low level of familiarity with a class of entities in the category because of infrequent use may be treated differently than categories where a user would typically have a high level of familiarity if they are in the area frequently. As explained in further detail below with respect to FIGS. 7-9, the search result customization component 228 may take into account a user's familiarity with different categories of businesses in the area of interest.

In one aspect, the search result customization component 228 may assign different categories of search results to less than all available familiarity levels to limit available customization. For example, search results returned in response to a search for "car rentals" may only be eligible for the low and medium familiarity level customization. Under the low familiarity customization, full navigation information may be provided, whereas with the medium level of familiarity, less granular navigation information may be provided. Alternatively or additionally, the search result customization component 228 may include navigation information with the search results but display it with a different level of prominence based on the user familiarity.

The digital assistant component 230 can engage the user to confirm familiarity levels, present search results, and provide other services that are customized based on user familiarity. The digital assistant component 230 may initiate a questionnaire with the user to confirm the user's familiarity level with various geographic areas. For example, the personal digital assistant component 230 could provide a definition of what constitutes a medium level of familiarity, describe an area, and then ask the user whether the area presently associated with a medium level of familiarity is accurately classified. The digital assistant component 230 can change the familiarity level based on the user's response.

The digital assistant component 230 can also initiate a conversation with the user to establish the customization settings for the user. For example, directionally challenged users may want maximum navigation information regardless of familiarity level with an area.

The digital assistant component 230 may initiate other services with the user that are customizable based on a familiarity with an area. For example, the digital assistant component 230 may provide navigation information automatically in response to an upcoming calendar appointment. The level of navigation information or the decision whether or not to even provide navigation information in this situation can be customized based on familiarity with the area where the appointment is to occur.

The server 240 can include a search engine component 250, a relevance ranking component 252, an area of interest component 254, a location component 256, a familiarity component 258, a search result customization component 260, and a digital assistant component 262.

The search engine component 250 can receive the search input from query component 220 of the computing device 210 over the wide area network 235. In addition, the search engine component 250 can, upon receipt of the search input, generate a series of search results related to the search input.

The relevance ranking component 252 can rank the series of search results in a manner typical to a search engine. For example, the series of search results may be ranked by the relevance ranking component 252 based on traffic to a website and/or links to that website found on other websites. In aspects, the relevance ranking component 252 does not rank the series of search results based on the user's familiarity level with an area of interest.

The area of interest component 254 can determine the area of interest associated with the search input. Like the area of interest component 224 of the computing device 210, the area of interest component 254 may first divide a geographic area into a plurality of zones. Alternatively or additionally, the plurality of zones can include different points of interest, including entertainment or shopping districts. In one aspect, the geographic zones and point of interest zones can overlap. Thus, multiple zones may be combined to form the "area of interest" associated with the search input.

As an alternative to the zones described above, the area of interest component 254 may designate an area of interest as a city, town, neighborhood, point of interest, or other similar area. When a specific location is given in the search input, for example, the name of a restaurant having a known location, the area of interest component 254 may limit the area of interest to that restaurant.

In an aspect, the area of interest component 254 can derive the area of interest from terms included within the search query. Alternatively, the area of interest component 254 can define the area of interest such that it includes one or more zones touching a circle with a center point at the location of the computing device 210 through which the search input was submitted and a radius that extends a threshold distance (e.g., two miles, five miles) from the center. Alternatively, the area of interest component 254 can define the area of interest as the zone or zones in which the user's computing device 210 is located.

In one aspect, the area of interest component 254 can determine the area of interest by first evaluating the search input for location information. If no location information is detected, then the present location of the computing device 210 can be used to establish the area of interest. Location information can be explicit or implicitly derived. Explicit location information includes the name of a city, park, neighborhood, or other known geographic entity. Implicit location information includes the name of a uniquely identifiable entity that is associated with location information. If the area of interest component 254 determines that the search input does not explicitly or implicitly include location information, the area of interest component 254 can assign the present location of the computing device 210 through which the search input is submitted as the area of interest.

The location component 256 can determine and store a user's location data in the form of a history of network connection points accessed by the user's computing device 210. Network access points can include Wi-Fi hot spots, cell towers, and other wired or wireless connection points having a known location. The access point may be identified through an IP address associated with the component. The IP address can be associated with a geographic area that is then included within the user's location data.

The location component 256 may also include user location data obtained from the user's or others' social posts. For example, a user could be tagged in a post that is associated with an entity having a known location, such as a concert venue. The social posts may include the name of a restaurant or other business having a known location.

The location component 256 can also include location data obtained from user profiles. For example, a user's profile on a social network may include designations of one or more cities in which the user has lived. A user profile may include a home address, work address, or other information provided when registering a device or subscribing to a service.

The location component 256 can also determine and store at least a portion of the location data generated by the computing device 210. In aspects, the computing device 210 can be a GPS-enabled device that can track its own location and keep a record of locations visited and upload that information to the location component 256. In addition to GPS data submitted by the computing device 210, the location data generated by the computing device 210 and submitted to the location component 256 may include data obtained from the use of Wi-Fi hot spots, cell towers, and other network communication access points.

The familiarity component 258 can determine the user's familiarity level with respect to the area of interest. In aspects, the familiarity component 258 can include a user's location profile, which can be used to retrieve the user's familiarity level therefrom. The location profile may be determined by the familiarity component 258 based on at least a portion of the user's activities on the network 235. Additionally or alternatively, all or a portion of the location profile may be generated on the computing device 210 as mentioned above, which can then be uploaded to the familiarity component 258. The familiarity component 258 can store the user's familiarity level with one or more zones, as described above. The zones can be geographic in nature and/or based on points of interest.

In certain aspects, the familiarity component 258 does not require the use of predefined zones when determining a user's familiarity level. For example, the familiarity component 258 can build the familiarity level as a "heat map." "Hot" areas are those where the user visits frequently and "cold" areas are visited infrequently. In this case, the familiarity component 258 compares the area of interest, whether defined as a zone or not, to the heat map to determine the user's familiarity with the area of interest.

The familiarity component 258 may define a user's familiarity by using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels.

As an alternative to retrieving the familiarity level from the user's location profile, the familiarity component 258 can determine a user's familiarity level with an area of interest at run time by analyzing available user location data, e.g., location data determined from the location component 256 on the server 240 and/or location data determined from the location component 222 of the computing device 210 received by the server 240.

The search result customization component 260 can customize the search results based on the user's familiarity level with the area of interest. Area-customized search results can take several different forms. In one aspect, the search results themselves include a standard, non-customized format, such as that generated by the relevance ranking component 252, but are re-ranked by the search result customization component 260 in an order that is area-customized.

In another aspect, the search result customization component 260 modifies the search results themselves based on a user's familiarity with an area. For example, a search result within an area with which the user has a high level of familiarity may not include navigation information. Instead, dinner specials or new menu items for a restaurant that is the subject of a search result are surfaced.

In aspects, the search result customization component 260 can both individually customize the search results to include the information that is most relevant given the user's familiarity and re-rank the search results based on relevance.

The search result customization component 260 can modify a single result but could also modify the layout or information included in a search results page. For example, if a particular search result is presented with a map by default, then the map may be omitted from the search results page when the area of interest associated with the search input is an area the user has a high level of familiarity with.

In one aspect, the search result customization component 260 may customize different categories of searches in different ways. Categories where the user may be assumed to have a low level of familiarity with a class of entities in the category because of infrequent use may be treated differently than categories where a user would typically have a high level of familiarity if they are in the area frequently. As explained in further detail below with respect to FIGS. 7-9, the search result customization component 260 may take into account a user's familiarity with different categories of businesses in the area of interest.

In one aspect, the search result customization component 260 may assign different categories of search results to less than all available familiarity levels to limit available customization. For example, search results returned in response to a search for "car rentals" may only be eligible for the low and medium familiarity level customization. Under the low familiarity customization, full navigation information may be provided, whereas with the medium level of familiarity, less granular navigation information may be provided. Alternatively or additionally, the search result customization component 260 may include navigation information with the search results but display it with a different level of prominence based on the user familiarity.

The digital assistant component 262 can remotely provide the same services described above with reference to the digital assistant component 230. Additionally or alternatively, the digital assistant component 262 can coordinate access to information and services for digital assistants operating a user's different computing devices.

Figure 3:
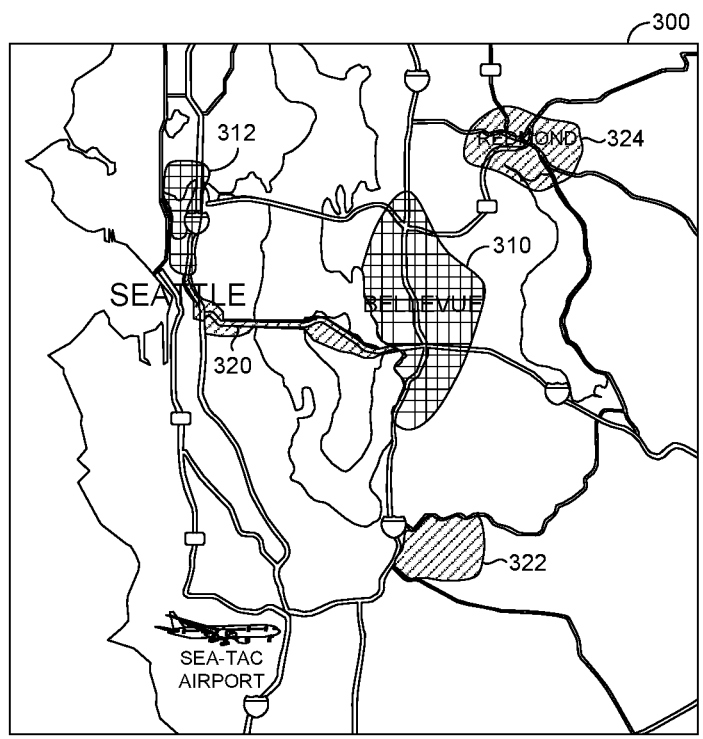
FIG. 3 is a map depicting zones having high, medium, and low familiarity levels for a user in accordance with one aspect of the present invention.

Turning now to FIG. 3, a map 300 of a user's familiarity zones within the Seattle metropolitan area is provided, in accordance with an aspect of the present invention. As mentioned, a person can have different levels of familiarity with different areas. Aspects of the present invention analyze location data to determine a user's familiarity level with different areas. Three different familiarity levels are shown on map 300. Familiarity zone 310 and familiarity zone 312 are assigned the highest level of familiarity. Familiarity zone 320, familiarity zone 322, and familiarity zone 324 are assigned a medium level of familiarity. All other areas of the Seattle metropolitan area are assigned a low level of familiarity. Aspects of the present invention are not limited to using three levels of familiarity.

Familiarity zone 310 corresponds to the city of Bellevue. In the present example, the user may live in the city of Bellevue and commute through familiarity zone 320 to Seattle. The user may work in familiarity zone 312, which does not encompass the entire city of Seattle but only an area where the user's location data indicates the user is present a significant amount of time. Because the user either lives or works in familiarity zones 310 and 312, the user may be assumed to have a familiarity with nearby businesses and a high level of navigational competency. As explained previously, search results may be customized based on the high level of familiarity to de-emphasize navigational features of search results and/or de-emphasize common information that is likely known by a person familiar with an area.

Familiarity zone 320 covers the user's commute route between Seattle and Bellevue. Familiarity zone 320 is assigned a medium level of familiarity. While the user is frequently present within familiarity zone 320, the user may not stop within familiarity zone 320 on a frequent basis. This illustrates that the familiarity zone can be assigned based on both a user's frequent presence within a zone and the type of activities that the user is engaged in while in the zone. Driving through an area frequently without stopping to eat, shop, or perform other activities may give the user a high or moderate understanding of roads and routes but may not give the user much chance to understand available restaurants or other businesses. The medium level of familiarity may assume a moderate or high level of navigational competency and a moderate level of business familiarity and customize search results appropriately.

Familiarity zone 324 and familiarity zone 322 are assigned a medium level of familiarity. Notice that the route to these zones is classified as low (low familiarity is designated by the absence of hashing), indicating that the user is not frequently present on a route to these locations above a threshold required to satisfy a medium level familiarity. In this example, the user previously lived in familiarity zone 322 and previously worked in familiarity zone 324. The user may still visit these zones on occasion.

Though not shown, zones 322 and 324 were previously assigned a high familiarity level when the user lived or worked in the zones. The current medium familiarity level illustrates that the familiarity zones can be adjusted based on recent location activity. In effect, the familiarity assignment can give more weight to recent location data causing the familiarity zone rating to decay over time when the user spends less time in an area. The familiarity level zone decay is appropriate because businesses change over time, and it may not be desirable to assume that the user has a high level of familiarity with area businesses absent a recent presence in the area.

In one aspect, the familiarity zones are derived from a heat map. A heat map organizes a user's location data into regions running, metaphorically, from hot to cold. The hot areas can represent areas the user visits frequently and the cold areas represent areas the user never visits. A great number of gradients between hot and cold are possible. The heat map can delineate small differences in a user's location history. For example, an area the user visits five times a week may be differentiated from an area the user visits six times a week. The familiarity zones may be mapped to a threshold range in the heat map. For example, areas having a location frequency above a threshold may be assigned a certain familiarity range. Thus, an area a user visits five times a week may be grouped into the same familiarity zone as an area visited six times a week.

The threshold used to form a familiarity zone may be established editorially to delineate the type of customization a person is likely to want given their familiarity level. In other words, the threshold can be set editorially to identify areas the user has different levels of familiarity with in way that maps to likely information needs. Classifying an area into a zone scheme and a customization policy into the same zone scheme allows for a one-to-one comparison when selecting a customization. Alternatively, in one aspect a familiarity zone is a range within the heat map and the actual familiarity zones need not be delineated as shown in FIG. 3. Instead, the customization scheme is defined by a range on the heat map and the rating on the heat map for the area of interest can server as the familiarity level.

Figure 4:
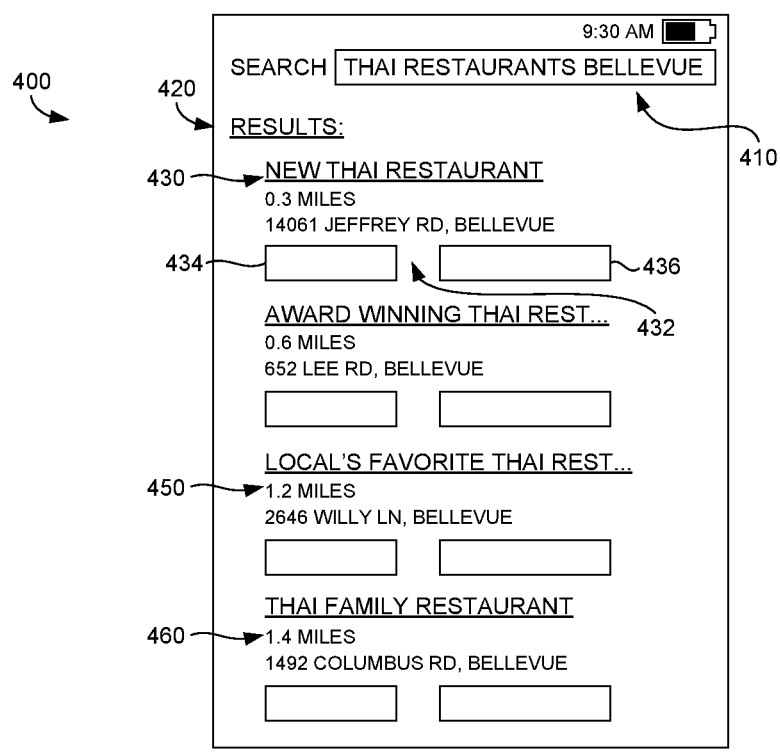
FIG. 4 is an exemplary user interface in accordance with one aspect of the present invention, particularly showing area-customized search results for a user having a high familiarity level with the area of interest.

Turning now to FIG. 4, a user interface 400 is depicted in accordance with one aspect of the present invention. The user interface 400 can include a user's search query 410, "Thai restaurants Bellevue," and the search results 420, which have been customized based on the user's high familiarity level with respect to the area of interest, i.e., Bellevue. Since the user has a high familiarity level with the Bellevue area, the search results 420 have been customized to reflect that the user is likely already aware of the Local's Favorite Thai Restaurant and the well-known Thai Family Restaurant, and is likely searching for any new Thai restaurants or Thai restaurants the user is unaware of. Accordingly, the top search result 430 lists the New Thai Restaurant in Bellevue, while the bottom two search results 450 and 460 list the Local's Favorite Thai Restaurant and the well-known Thai Family Restaurant, respectively.

The area-customized search results 420 of FIG. 4 may include additional related content 432. For example, the related content 432 can include a relevant content portion 434. The relevant content portion 434 can include news or related information about the particular search result, such as news articles about the opening of the new restaurant or specials being served at that restaurant. In one aspect, the relevant content portion 434 can provide any information relevant to the user to decide whether or not they should visit the corresponding restaurant, such as reviews of the restaurant. In addition, the related content 432 may include a navigation portion 436 to provide directions to the user. Since, in this aspect, the user has a high familiarity level with respect to Bellevue, the navigation portion 436 may include the cross streets corresponding to the restaurant's location and no further navigation information. In addition, if the user desires more information, a link to additional navigation information can be provided in the navigation portion 436.

Figures 5, 6:
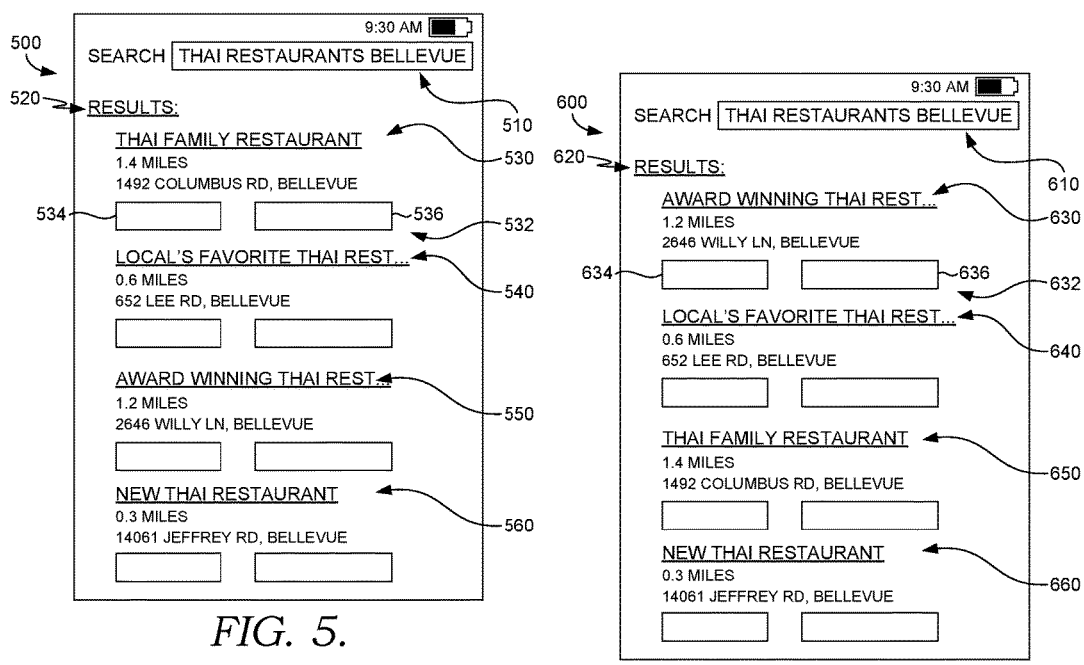
FIG. 5 is an exemplary user interface in accordance with another aspect of the present invention, particularly showing area-customized search results for a user having a medium familiarity level with the area of interest.
FIG. 6 is an exemplary user interface in accordance with yet another aspect of the present invention, particularly showing area-customized search results for a user having a low familiarity level with the area of interest.

Turning now to FIG. 5, a user interface 500 is depicted in accordance with another aspect of the present invention. The user interface 500 includes an identical search query 510 as the search query 410 of FIG. 4, yet the search results 520 have been customized based on the user's medium familiarity level with respect to Bellevue. The customization of the search results 520 reflect that the user may be less concerned with a new Thai restaurant and is likely looking for an established, well-known Thai restaurant or a Thai restaurant frequented by locals. Accordingly, the top search result 530 lists the established, well-known Thai Family Restaurant, and the second result 540 lists the Local's Favorite Thai Restaurant. The next search result 550 listed is the Award Winning Thai Restaurant, and the bottom search result 560 lists the Thai restaurant most likely irrelevant to the user, the New Thai Restaurant.

Like the search results 420 of FIG. 4, the search results 520 of FIG. 5 can include related content 532. For example, the related content 532 for the top search result 530 can include a relevant content portion 534 and a navigation portion 536. The relevant content portion 534 may include ratings and/or reviews from customers or other relevant information regarding the overall perception of the restaurant. In the same or alternative aspects, the relevant content portion 534 may include any other type of information related to the search result, such as coupons or the night's specials. The navigation portion 536 can include an overview map marking the location of the restaurant, as the user may be somewhat familiar with the area and may not need detailed directions. In aspects, the navigation portion 536 can include a link to detailed directions to the restaurant from the user's current location.

Turning now to FIG. 6, a user interface 600 is depicted according to one aspect of the present invention. The user interface 600 can include a search query 610 and corresponding search results 620. The search query 610 of FIG. 6 is identical to the search query 410 of FIG. 4; however, the search results 620 have been customized based on the user's low familiarity with respect to Bellevue. The search results 620 are customized to reflect that since the user is unfamiliar with Bellevue, the user likely does not know about any Thai restaurants in Bellevue and is, thus, likely interested in the most popular or landmark Thai restaurants there. Accordingly, the top search result 630 lists the Award Winning Thai Restaurant, while the last search result 660 lists the New Thai Restaurant. In addition, the search results 640 and 650 are close to the top search result 630 and list the Local's Favorite Thai Restaurant and the well-known Thai Family Restaurant, respectively.

Like the search results 520 of FIG. 5, the search results 620 of FIG. 6 can include related content that is relevant to the individual search results. For example, search result 630 can include related content 632 that corresponds to the Award Winning Thai Restaurant. The related content 632 can include a relevant content portion 634 and a navigation portion 636. The relevant content portion 634 can include the same type of information as the relevant content portion 534 discussed above with reference to FIG. 5. As the user has a low familiarity level with the Bellevue area, the navigation portion 636 can include detailed directions, or a link to detailed directions, to the Award Winning Thai Restaurant from the user's present location.

Figure 7:
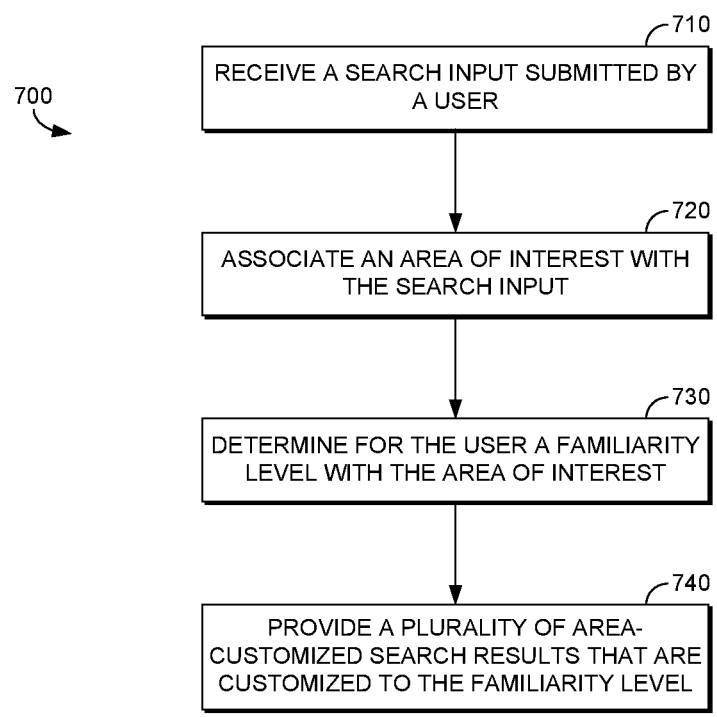
FIG. 7 is a flow chart showing a method for providing search results that are customized to a user's familiarity with an area of interest, in accordance with an aspect of the present invention.

Turning now to FIG. 7, a method 700 for providing search results that are customized to a user's familiarity with an area of interest is shown, in accordance with an aspect of the present invention. Method 700 may be performed by a user's computing device, such as a tablet, smartphone, or personal computer. Alternatively, method 700 may be performed in a data center.

At step 710, search input submitted by a user is received. The search input may comprise one or more alphanumeric characters forming part of a word, an entire word, or a series of words. The search input may be submitted in the form of keystrokes on a keyboard, handwritten input, or voice input. The handwritten input may be provided through a touchscreen interface or other suitable surface capable of digitizing handwriting into a computer input. The voice input may be received through a microphone associated with a computing device and converted to text for use as a computing input. In each of the examples above, the search input is initially submitted through a user device.

Though the search input may be initially submitted through a keyboard, microphone, or touch surface, aspects of the present invention may also use "received" in a sense of receiving the search input from another computing component. The computing component may be local or remote. For example, a cloud-based search engine may receive the search input from a computing device over a network connection. Alternatively, a search customization component running on a smartphone may receive the query from a query component also running on the smartphone.

At step 720, a geographic area of interest ("area of interest") is associated with the search input. Aspects of the invention may first divide a geographic area into a plurality of zones. For example, a city could be divided into a plurality of geographic zones based on size. For example, the city could be divided into square zones that are about one square mile each, two square miles, and such. Alternatively or additionally, the plurality of zones can include different points of interest, including entertainment or shopping districts. The zones based on points of interest may have a variable size and shape. For example, the zone for a shopping mall can include the mall proper and the surrounding area. The surrounding area may be editorially determined to encompass an area that a person is likely to associate with a mall area. Alternatively, the surrounding area may be derived by analyzing location data derived from multiple users over time to generate a location "hot spot" around the mall. A similar method could be used for any point of interest. In one aspect, the geographic zones and point of interest zones can overlap. Thus, multiple zones may be combined to form the "area of interest" associated with the search input.

As an alternative to the zones described above, an area of interest could be a city, town, neighborhood, point of interest, or other similar area. When a specific location is given in the search input, for example, the name of a restaurant having a known location, then the area of interest can be limited to the restaurant.

In an aspect, the area of interest is derived from terms included within the search query. For example, a search input may recite, "restaurants in Leawood, Kans." In this case, the area of interest may be designated as Leawood, Kans., and include all zones associated with Leawood, Kans. Alternatively, the area of interest can include one or more zones touching a circle with a center point at the location of a computing device through which the search input was submitted and a radius that extends a threshold distance (e.g., two miles, five miles) from the center. Alternatively, the area of interest can be the zone or zones in which the user's computing device is located.

In one aspect, the area of interest is determined by first evaluating the search input for location information. If no location information is detected, then the computing device's present location can be used to establish the area of interest. Location information can be explicit or implicitly derived. Explicit location information includes the name of a city, park, neighborhood, or other known geographic entity. Implicit location information includes the name of a uniquely identifiable entity that is associated with location information. For example, the name of a restaurant having only one location (or one location within a designated distance from the user, such as 50 miles) can be implicit location information because the address of the restaurant can be used to establish the area of interest. Upon determining that the search input does not explicitly or implicitly include location information, the present location of the computing device through which the search input is submitted may be used to assign an area of interest.

At step 730, a user's familiarity level with the area of interest is determined for the user who submitted the search input. The familiarity level may be retrieved from a user's location profile. The location profile can store the user's familiarity level with one or more zones, as described above. The zones can be geographic in nature and/or based on points of interest. Using the same zones to define familiarity level and define an area of interest allows for a one-to-one comparison.

Aspects of the invention are not limited to the use of predefined zones. For example, the familiarity level could be built as a "heat map." "Hot" areas are those where the user visits frequently and "cold" areas are visited infrequently. In this case, the area of interest, whether defined as a zone or not, is compared with the heat map to determine the user's familiarity with the area of interest.

The user's familiarity may be defined using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels.

The location profile may be generated by evaluating explicit user inputs and by analyzing the user's location data. The location profile may be generated by a search service and updated periodically. Alternatively, the location profile may be generated on a user device. Each user device could have a location profile specific to the device. The location profile may be stored on the user's devices and/or stored remotely.

As an alternative to accessing a location profile, the user's familiarity level with an area of interest can be determined at run time by analyzing available user location data.

As mentioned, the user location profile may be built by analyzing user location data. The user location data describes locations the user has been in the past. The user location data may be gathered by one or more location enabled devices. Location enabled devices can include the user's GPS-enabled device, such as a smartphone. A user's car navigation system is another example of a location enabled device. A GPS-enabled device can track its own location and keep a record of locations visited. The GPS-enabled device may also periodically broadcast a location history or present location to one or more network components that can store the device's location at a particular time. In addition to GPS, a location enabled device may ascertain its location using Wi-Fi hot spots, cell towers, and other methods.

Other methods of gathering a user's user location data may be used in combination with or instead of information provided by a location enabled device. The user's location information can include a history of network connection points accessed by the user's one or more computing devices. The connection points may be stored locally on the user device and then accessed periodically to update the user's location profile. Network access points can include Wi-Fi hot spots, cell towers, and other wired or wireless connection points having a known location. The access point may be identified through an IP address associated with the component. The IP address can be associated with a geographic area that is then included within the user's location data.

Additional user location data includes the user's or others' social posts. For example, a user could be tagged in a post that is associated with an entity having a known location, such as a concert venue. The social posts may include the name of a restaurant or other business having a known location.

An additional type of location data is the user's profile or profiles. For example, a user's profile on a social network may include designations of one or more cities in which the user has lived. A user profile may include a home address, work address, or other information provided when registering a device or subscribing to a service. A specific location profile may be built for the user by asking the user to provide locations where the user has different levels of familiarity. The user may be quizzed by a personal assistant that is able to provide or help provide the user's familiarity level with different areas of interest.

When determining a user's familiarity level with a zone, the different location information may be given different weight. For example, social posts may be given less weight than the user's answer to a query about familiarity. A user's social posts may be given more weight than others' social posts.

In step 740, a plurality of area-customized search results are provided that are customized to the familiarity level of the user to the area of interest. Area-customized search results can take several different forms. In one aspect, the search results themselves include a standard, non-customized format but are re-ranked and presented in an order that is area-customized. For example, when searching for a restaurant in an area where the user has a low level of familiarity, standard or common restaurants may be given elevated relevance. Conversely, when results are within an area with which the user has a high level of familiarity, then new or unique search results may be elevated and common search results, which the user is presumed to have knowledge of already, are decreased in relevance.

In another aspect, the search results themselves are modified based on a user's familiarity with an area. For example, a search result within an area with which the user has a high level of familiarity may not include navigation information. Instead, dinner specials or new menu items for a restaurant that is the subject of a search result are surfaced. In another example, the search result could include what is presently showing at a movie theatre, and not directions to the movie theatre.

In aspects, area-customized search results can be both individually customized to include the information that is most relevant given the user's familiarity and re-ranked based on relevance.

The area-customized search results can modify a single result but could also modify the layout or information included in a search results page. For example, if a particular search result is presented with a map by default, then the map may be omitted from the search results page when the area of interest associated with the search input is an area the user has a high level of familiarity with. This allows for better use of the limited real estate on the search results page.

In one aspect, different categories of searches are customized in different ways. Categories where the user may be assumed to have a low level of familiarity with a class of entities in the category because of infrequent use may be treated differently than categories where a user would typically have a high level of familiarity if they are in the area frequently. For example, search results returned in response to a search for "nearby restaurants" could be customized in a different manner from search results returned in response to a search for "nearby car rental." The category customization could take into account a user's familiarity with different categories of businesses in the area of interest. A user may have different levels of familiarity with different categories of businesses in an area of interest. For example, a user that frequents restaurants in an area may have a high level of familiarity with the restaurants in the area. However, the user may have a medium level of familiarity with dry cleaners in the area. In this example, the search results may include less navigation information when the area is familiar but may not be re-ranked or otherwise adjusted. In general, search results associated with categories of businesses associated with entertainment may be modified to highlight new features or otherwise answer the question, "what has changed recently." Search results associated with categories of businesses associated with utilitarian tasks may include standard information, except with less granular navigation information.

In one aspect, different categories of searches may be assigned to less than all available familiarity levels to limit available customization. For example, search results returned in response to a search for "car rentals" may only be eligible for the low and medium familiarity level customization. Under the low familiarity customization, full navigation information may be provided, whereas with the medium level of familiarity, less granular navigation information may be provided. For example, a search result for the same restaurant may include different information depending on the user's familiarity with an area of interest in which the restaurant is located. In one aspect, the search result would not include navigation information while in another level of familiarity the search result would include navigation information. Alternatively or additionally, navigation information may be included but displayed with a different level of prominence based on the user's familiarity. In general, the user's interest in navigation information can be presumed to decrease with familiarity with an area. In other words, the user is less likely to be searching for directions to a location within an area when the user has a high level of familiarity with the area of interest.

Figure 8:
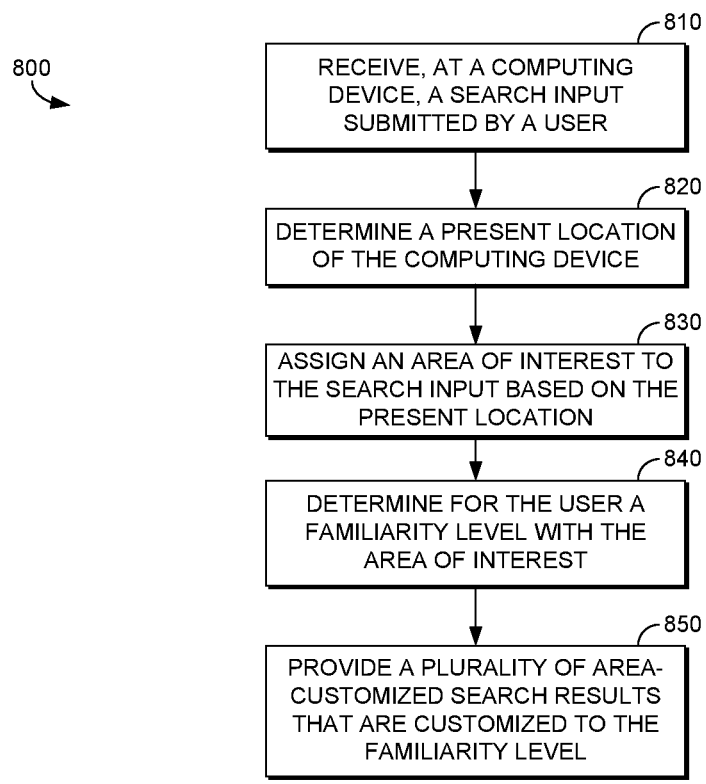
FIG. 8 is a flow chart showing a method for providing search results that are customized to a user's familiarity with an area of interest, in accordance with another aspect of the present invention.

Turning now to FIG. 8, a method 800 for providing search results that are customized to a user's familiarity with an area of interest is provided, in accordance with an aspect of the present invention. Method 800 may be performed on a mobile device, personal computing device, tablet, or other suitable computing device.

At step 810, a search input submitted by a user is received at a computing device. As mentioned, the search input may comprise one or more alphanumeric characters forming part of a word, an entire word, or a series of words. The search input may be submitted in the form of keystrokes on a keyboard, handwritten input, or voice input. The handwritten input may be provided through a touchscreen interface or other suitable surface capable of digitizing handwriting into a computer input. The voice input may be received through a microphone associated with a computing device and converted to text for use as a computing input. In each of the examples above, the search input is initially submitted through a computing device.

Though the search input may be initially submitted through a keyboard, microphone, or touch surface, aspects of the present invention may also use "received" in a sense of receiving the search input from another computing component. The computing component may be local or remote. For example, a cloud-based search engine may receive the search input from a computing device over a network connection. Alternatively, a search customization component running on a smartphone may receive the query from a query component also running on the smartphone.

At step 820, a present location of the computing device is determined. As described above, the present location of a user may be determined by a location enabled device, by an explicit user input, or by identifying a location of a network connection point to which the user is presently connected.

At step 830, the present location is used to assign an area of interest to the search input. Aspects of the invention may first divide a geographic area into a plurality of zones. For example, a city could be divided into a plurality of geographic zones based on size. For example, the city could be divided into square zones that are about one square mile each, two square miles, and such. Alternatively or additionally, the plurality of zones can include different points of interest, including entertainment or shopping districts. The zones based on points of interest may have a variable size and shape. For example, the zone for a shopping mall can include the mall proper and the surrounding area. The surrounding area may be editorially determined to encompass an area that a person is likely to associate with a mall area. Alternatively, the surrounding area may be derived by analyzing location data derived from multiple users over time to generate a location "hot spot" around the mall. A similar method could be used for any point of interest. In one aspect, the geographic zones and point of interest zones can overlap. Thus, multiple zones may be combined to form the "area of interest" associated with the search input.

As an alternative to the zones described above, an area of interest could be a city, town, neighborhood, point of interest, or other similar area. When a specific location is given in the search input, for example, the name of a restaurant having a known location, then the area of interest can be limited to the restaurant.

In an aspect, the area of interest may be at least partially derived from terms included within the search input. For example, a search input may recite, "restaurants in Leawood, Kans." In this case, the area of interest may be designated as Leawood, Kans., and include all zones associated with Leawood, Kans. Alternatively, the area of interest can include one or more zones touching a circle with a center point at the location of a computing device through which the search input was submitted and a radius that extends a threshold distance (e.g., two miles, five miles) from the center. Alternatively, the area of interest can be the zone or zones in which the user's computing device is located.

In one aspect, the area of interest is determined by first evaluating the search input for location information. If no location information is detected, then the computing device's present location can be used to establish the area of interest. Location information can be explicit or implicitly derived. Explicit location information includes the name of a city, park, neighborhood, or other known geographic entity. Implicit location information includes the name of a uniquely identifiable entity that is associated with location information. For example, the name of a restaurant having only one location (or one location within a designated distance from the user, such as 50 miles) can be implicit location information because the address of the restaurant can be used to establish the area of interest. Upon determining that the search input does not explicitly or implicitly include location information, the present location of the computing device through which the search input is submitted may be used to assign an area of interest.

At step 840, the user's familiarity level with the area of interest is determined. The familiarity level may be retrieved from a user's location profile. The location profile can store the user's familiarity level with one or more zones, as described above. The zones can be geographic in nature and/or based on points of interest. Using the same zones to define familiarity level and define an area or interest allows for a one-to-one comparison.

Aspects of the invention are not limited to the use of predefined zones. For example, the familiarity level could be built as a "heat map." "Hot" areas are those where the user visits frequently and "cold" areas are visited infrequently. In this case, the area of interest, whether defined as a zone or not, is compared with the heat map to determine the user's familiarity with the area of interest.

The user's familiarity may be defined using familiarity thresholds. For example, the familiarity thresholds may define a high, medium, and low level of familiarity. The familiarity thresholds can be established based on visits to an area within a period of time (e.g., one year, one month). The thresholds between the levels may be set to determine or delineate the familiarity levels.

The location profile may be generated by evaluating explicit user inputs and by analyzing the user's location data. The location profile may be generated by a search service and updated periodically. Alternatively, the location profile may be generated on a user device. Each user device could have a location profile specific to the device. The location profile may be stored on the user's devices and/or stored remotely.

As an alternative to accessing a location profile, the user's familiarity level with an area of interest can be determined at run time by analyzing available user location data.

As mentioned, the user location profile may be built by analyzing user location data. The user location data describes locations the user has been in the past. The user location data may be gathered by one or more location enabled devices. Location enabled devices can include the user's GPS-enabled device, such as a smartphone. A user's car navigation system is another example of a location enabled device. A GPS-enabled device can track its own location and keep a record of locations visited. The GPS-enabled device may also periodically broadcast a location history or present location to one or more network components that can store the device's location at a particular time.

In addition to GPS, a location enabled device may ascertain its location using Wi-Fi hot spots, cell towers, and other methods.

Other methods of gathering a user's user location data may be used in combination with or instead of information provided by a location enabled device. The user's location information can include a history of network connection points accessed by the user's one or more computing devices. The connection points may be stored locally on the user device and then accessed periodically to update the user's location profile. Network access points can include Wi-Fi hot spots, cell towers, and other wired or wireless connection points having a known location. The access point may be identified through an IP address associated with the component. The IP address can be associated with a geographic area that is then included within the user's location data.

Additional user location data includes the user's or others' social posts. For example, a user could be tagged in a post that is associated with an entity having a known location, such as a concert venue. The social posts may include the name of a restaurant or other business having a known location.

An additional type of location data is the user's profile or profiles. For example, a user's profile on a social network may include designations of one or more cities in which the user has lived. A user profile may include a home address, work address, or other information provided when registering a device or subscribing to a service. A specific location profile may be built for the user by asking the user to provide locations where the user has different levels of familiarity. The user may be quizzed by a personal assistant that is able to provide or help provide the user's familiarity level with different areas of interest.

When determining a user's familiarity level with a zone, the different location information may be given different weight. For example, social posts may be given less weight than the user's answer to a query about familiarity. A user's social posts may be given more weight than others' social posts.

At step 850, a plurality of area-customized search results that are customized to the familiarity level are provided. As mentioned, area-customized search results can take several different forms. In one aspect, the search results themselves include a standard, non-customized format but are re-ranked and presented in an order that is area-customized. For example, when searching for a restaurant in an area where the user has a low level of familiarity, standard or common restaurants may be given elevated relevance. Conversely, when results are within an area with which the user has a high level of familiarity, then new or unique search results may be elevated and common search results, which the user is presumed to have knowledge of already, are decreased in relevance.

In another aspect, the search results themselves are modified based on a user's familiarity with an area. For example, a search result within an area with which the user has a high level of familiarity may not include navigation information. Instead, dinner specials or new menu items for a restaurant that is the subject of a search result are surfaced. In another example, the search result could include what is presently showing at a movie theatre, and not directions to the movie theatre.

In aspects, area-customized search results can be both individually customized to include the information that is most relevant given the user's familiarity and re-ranked based on relevance.

The area-customized search results can modify a single result but could also modify the layout or information included in a search results page. For example, if a particular search result is presented with a map by default, then the map may be omitted from the search results page when the area of interest associated with the search input is an area the user has a high level of familiarity with. This allows for better use of the limited real estate on the search results page.

In one aspect, different categories of searches are customized in different ways. Categories where the user may be assumed to have a low level of familiarity with a class of entities in the category because of infrequent use may be treated differently than categories where a user would typically have a high level of familiarity if they are in the area frequently. For example, search results returned in response to a search for "nearby restaurants" could be customized in a different manner from search results returned in response to a search for "nearby car rental." The category customization could take into account a user's familiarity with different categories of businesses in the area of interest. A user may have different levels of familiarity with different categories of businesses in an area of interest. For example, a user that frequents restaurants in an area may have a high level of familiarity with the restaurants in the area. However, the user may have a medium level of familiarity with dry cleaners in the area. In this example, the search results may include less navigation information when the area is familiar but may not be re-ranked or otherwise adjusted. In general, search results associated with categories of businesses associated with entertainment may be modified to highlight new features or otherwise answer the question, "what has changed recently." Search results associated with categories of businesses associated with utilitarian tasks may include standard information, except with less granular navigation information.

In one aspect, different categories of searches may be assigned to less than all available familiarity levels to limit available customization. For example, search results returned in response to a search for "car rentals" may only be eligible for the low and medium familiarity level customization. Under the low familiarity customization, full navigation information may be provided, whereas with the medium level of familiarity, less granular navigation information may be provided. For example, a search result for the same restaurant may include different information depending on the user's familiarity with an area of interest in which the restaurant is located. In one aspect, the search result would not include navigation information while in another level of familiarity the search result would include navigation information. Alternatively or additionally, navigation information may be included but displayed with a different level of prominence based on the user's familiarity. In general, the user's interest in navigation information can be presumed to decrease with familiarity with an area. In other words, the user is less likely to be searching for directions to a location within an area when the user has a high level of familiarity with the area of interest.

Figure 9:
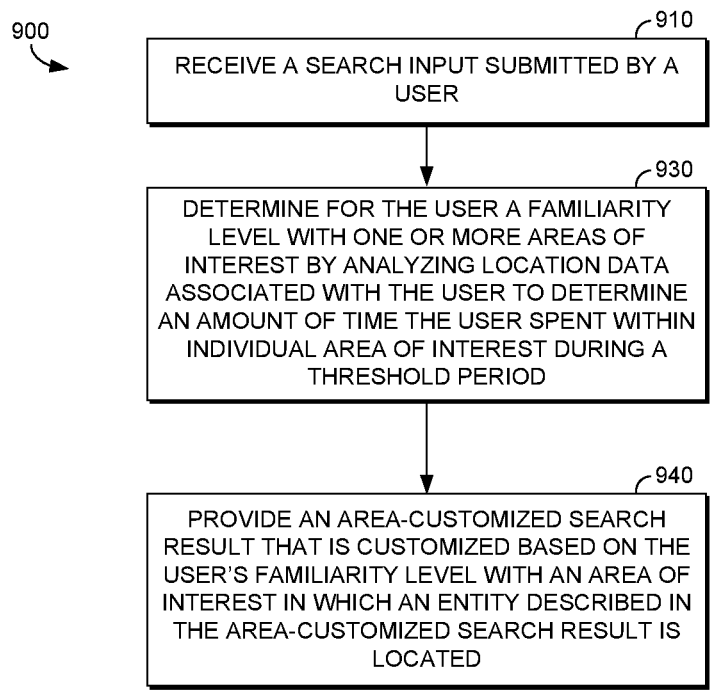
FIG. 9 is a flow chart showing a method for providing search results that are customized to a user's familiarity with an area of interest, in accordance with yet another aspect of the present invention.

Turning now to FIG. 9, a method 900 of providing search results that are customized to a user's familiarity with an area of interest is provided in accordance with an aspect of the present invention. Method 900 may be performed on a mobile device, personal computing device, tablet, or other suitable computing device.

At step 910, a search input submitted by a user is received. As mentioned, the search input may comprise one or more alphanumeric characters forming part of a word, an entire word, or a series of words. The search input may be submitted in the form of keystrokes on a keyboard, handwritten input, or voice input. The handwritten input may be provided through a touchscreen interface or other suitable surface capable of digitizing handwriting into a computer input. The voice input may be received through a microphone associated with a computing device and converted to text for use as a computing input. In each of the examples above, the search input is initially submitted through a user device.

Though the search input may be initially submitted through a keyboard, microphone, or touch surface, aspects of the present invention may also use "received" in a sense of receiving the search input from another computing component. The computing component may be local or remote. For example, a cloud-based search engine may receive the search input from a computing device over a network connection. Alternatively, a search customization component running on a smartphone may receive the query from a query component also running on the smartphone.

At step 920, a user's familiarity level with one or more areas of interest is determined by analyzing location data associated with the user to determine an amount of time the user spent within an individual area of interest during a threshold period. In one aspect, the threshold period is one year. In another aspect, the threshold period is six months. In another aspect, a weighted algorithm is used to classify the user's familiarity. The weighted algorithm may give more weight to areas of interest the user has been present in recently. In other words, a user may be assigned a lower level of familiarity with an area the user spent time in ten or fifteen years ago but a higher level of familiarity with an area where the user has spent time in over the last six months, even if the user spent more total time in a location several years ago.

The familiarity level may be determined or retrieved from a user's location profile. The location profile can store the user's familiarity level with one or more zones, as described above. The zones can be geographic in nature and/or based on points of interest. Using the same zones to define familiarity level and define an area of interest allows for a one-to-one comparison.

Aspects of the invention are not limited to the use of predefined zones. For example, the familiarity level could be built as a "heat map." "Hot" areas are those where the user visits frequently and "cold" areas are visited infrequently. In this case, the area of interest, whether defined as a zone or not, is compared with the heat map to determine the user's familiarity with the area of interest.

The user's familiarity may be defined using familiarity thresholds. For example, the familiarity thresholds may define a high, medium, and low level of familiarity. The familiarity thresholds can be established based on visits to an area within the threshold periods mentioned above. The thresholds between the levels may be set to determine or delineate the familiarity levels.

The location profile may be generated by evaluating explicit user inputs and by analyzing the user's location data. The location profile may be generated by a search service and updated periodically. Alternatively, the location profile may be generated on a user device. Each user device could have a location profile specific to the device. The location profile may be stored on the user's devices and/or stored remotely.

As an alternative to accessing a location profile, the user's familiarity level with an area of interest can be determined at run time by analyzing available user location data.

As mentioned, the user location profile may be built by analyzing user location data. The user location data describes locations the user has been in the past. The user location data may be gathered by one or more location enabled devices. Location enabled devices can include the user's GPS-enabled device, such as a smartphone. A user's car navigation system is another example of a location enabled device. A GPS-enabled device can track its own location and keep a record of locations visited. The GPS-enabled device may also periodically broadcast a location history or present location to one or more network components that can store the device's location at a particular time. In addition to GPS, a location enabled device may ascertain its location using Wi-Fi hot spots, cell towers, and other methods.

Other methods of gathering a user's user location data may be used in combination with or instead of information provided by a location enabled device. The user's location information can include a history of network connection points accessed by the user's one or more computing devices. The connection points may be stored locally on the user device and then accessed periodically to update the user's location profile. Network access points can include Wi-Fi hot spots, cell towers, and other wired or wireless connection points having a known location. The access point may be identified through an IP address associated with the component. The IP address can be associated with a geographic area that is then included within the user's location data.

Additional user location data includes the user's or others' social posts. For example, a user could be tagged in a post that is associated with an entity having a known location, such as a concert venue. The social posts may include the name of a restaurant or other business having a known location.

An additional type of location data is the user's profile or profiles. For example, a user's profile on a social network may include designations of one or more cities in which the user has lived. A user profile may include a home address, work address, or other information provided when registering a device or subscribing to a service. A specific location profile may be built for the user by asking the user to provide locations where the user has different levels of familiarity. The user may be quizzed by a personal assistant that is able to provide or help provide the user's familiarity level with different areas of interest.

When determining a user's familiarity level with a zone, the different location information may be given different weight. For example, social posts may be given less weight than the user's answer to a query about familiarity. A user's social posts may be given more weight than others' social posts.

At step 940, an area-customized search result is provided. The area-customized search result is customized based on the user's familiarity level with an area of interest in which an entity described in the area-customized search result is located. As mentioned, area-customized search results can take several different forms. In one aspect, the search results themselves include a standard, non-customized format but are re-ranked and presented in an order that is area-customized. For example, when searching for a restaurant in an area where the user has a low level of familiarity, standard and common restaurants may be given elevated relevance. Conversely, when results are within an area with which the user has a high level of familiarity, then new or unique search results may be elevated and common search results, which the user is presumed to have knowledge of already, are decreased in relevance.

In another aspect, the search results themselves are modified based on a user's familiarity with an area. For example, a search result within an area with which the user has a high level of familiarity may not include navigation information. Instead, dinner specials or new menu items for a restaurant that is the subject of a search result are surfaced. In another example, the search result could include what is presently showing at a movie theatre, and not directions to the movie theatre.

In aspects, area-customized search results can be both individually customized to include the information that is most relevant given the user's familiarity and re-ranked based on relevance.

The area-customized search results can modify a single result but could also modify the layout or information included in a search results page. For example, if a particular search result is presented with a map by default, then the map may be omitted from the search results page when the area of interest associated with the search input is an area the user has a high level of familiarity with. This allows for better use of the limited real estate on the search results page.

In one aspect, different categories of searches are customized in different ways. Categories where the user may be assumed to have a low level of familiarity with a class of entities in the category because of infrequent use may be treated differently than categories where a user would typically have a high level of familiarity if they are in the area frequently. For example, search results returned in response to a search for "nearby restaurants" could be customized in a different manner than search results returned in response to a search for "nearby car rental." The category customization could take into account a user's familiarity with different categories of businesses in the area of interest. A user may have different levels of familiarity with different categories of businesses in an area of interest. For example, a user that frequents restaurants in an area may have a high level of familiarity with the restaurants in the area. However, the user may have a medium level of familiarity with dry cleaners in the area. In this example, the search results may include less navigation information when the area is familiar but may not be re-ranked or otherwise adjusted. In general, search results associated with categories of businesses associated with entertainment may be modified to highlight new features or otherwise answer the question, "what has changed recently." Search results associated with categories of businesses associated with utilitarian tasks may include standard information, except with less granular navigation information.

In one aspect, different categories of searches may be assigned to less than all available familiarity levels to limit available customization. For example, search results returned in response to a search for "car rentals" may only be eligible for the low and medium familiarity level customization. Under the low familiarity customization, full navigation information may be provided, whereas with the medium level of familiarity, less granular navigation information may be provided. For example, a search result for the same restaurant may include different information depending on the user's familiarity with an area of interest in which the restaurant is located. In one aspect, the search result would not include navigation information while in another level of familiarity the search result would include navigation information. Alternatively or additionally, navigation information may be included but displayed with a different level of prominence based on the user's familiarity. In general, the user's interest in navigation information can be presumed to decrease with familiarity with an area. In other words, the user is less likely to be searching for directions to a location within an area when the user has a high level of familiarity with the area of interest.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer storage media having computer-executable instructions embodied thereon that, when executed by a computing device, perform a method of providing navigation directions that are customized to a user's level of familiarity with an area of interest, the method comprising:
   determining a first location associated with a query result;
   determining a route from a second location to the first location;
   determining an area associated with a portion of the route;
   determining the user's level of familiarity with the area, wherein the user's level of familiarity with the area is at least based on a social post, the social post is weighted based on a type of the social post, and a user's social post type for the area is given more weight than other users' social post types for the area; and
   providing navigation directions to the user, wherein the navigation directions associated with the portion of the route are customized based on the user's level of familiarity with the area, wherein the directions are customized by omitting presentation of a map that is presented as part of default navigation directions.

2. The media of claim 1, wherein the method further comprises determining the user's level of familiarity with the area by analyzing location data associated with the user to determine an amount of time the user spent within the area during a threshold period.

3. The media of claim 1, wherein the method further comprises determining the user's level of familiarity with the area by determining one or more of the user's home address and work address.

4. The media of claim 1, wherein the second location is a present location of the user.

5. The media of claim 1, wherein the navigation directions are customized at least by providing the navigation directions with a level of detail that is based on the user's familiarity with the area.

6. The media of claim 1, wherein the navigation directions are customized at least by displaying the navigation directions with a level of prominence that is based on the user's familiarity with the area.

7. The media of claim 2, wherein the user is assigned a low level of familiarity when the location data indicates the user has been present within the area two or less times during the threshold period.

8. The media of claim 2, wherein levels of familiarity level comprise at least a high level, a medium level, and a low level.

9. The media of claim 1, wherein the method further comprises determining multiple areas each associated with a respective portion of the route.

10. The media of claim 9, wherein navigation directions associated with each portion of the route are individually customized based on the user's level of familiarity with the respective area.

11. A method for providing navigation directions that are customized to a user's level of familiarity with an area of interest, the method comprising:
    receiving, at a computing device, a query submitted by a user;
    determining a first location associated with the query and a second location associated with the query;
    determining a route from the second location to the first location;
    determining an area associated with a portion of the route;
    determining the user's level of familiarity with the area, wherein the user's level of familiarity with the area is at least based on a social post, the social post is weighted based on a type of the social post, and a user's social post type for the area is given more weight than other users' social post types for the area; and
    providing navigation directions to the user, wherein the navigation directions associated with the portion of the route are customized based on the user's level of familiarity with the area, wherein the directions are customized by omitting presentation of a map that is presented as part of default navigation directions.

12. The method of claim 11, wherein a greater level of familiarity with the area results in a lesser level of detail in the navigation directions within the area, and wherein a lesser level of familiarity with the area results in greater level of detail in the navigation directions within the area.

13. The method of claim 11, wherein a greater level of familiarity with the area results in displaying the navigation directions with a different level of prominence than for a lesser level of familiarity with the area.

14. The method of claim 11, wherein the method further comprises determining the user's level of familiarity with the area by analyzing location data associated with the user to determine an amount of time the user spent within the area of interest during a threshold period.

15. The method of claim 14, wherein a low level of familiarity is determined when the location data indicates the user has been present within the area of interest two or less times during the threshold period.

16. One or more computer storage media having computer-executable instructions embodied thereon that, when executed by a computing device, perform a method of providing navigation directions that are customized to a user's level of familiarity with an area of interest, the method comprising:
    receiving a query submitted by a user;
    determining a first location associated with the query and a second location associated with the query;
    determining a route from the second location to the first location;
    determining an area associated with a portion of the route;
    determining the user's level of familiarity with the area, wherein the user's level of familiarity with the area is at least based on a social post, the social post is weighted based on a type of the social post, and a user's social post type for the area is given more weight than other users' social post types for the area; and
    providing navigation directions to the user, wherein the navigation directions associated with the portion of the route are customized based on the user's level of familiarity with the area, wherein a greater level of familiarity with the area results in a lesser level of detail in the navigation directions within the area, and wherein a lesser level of familiarity with the area results in greater level of detail in the navigation directions within the area and the directions are customized by omitting presentation of a map that is presented as part of default navigation directions.

17. The media of claim 16, wherein levels of familiarity comprise at least a high level, a medium level, and a low level.

18. The media of claim 16, wherein the method further comprises determining the user's level of familiarity with the area by analyzing location data associated with the user.

19. The media of claim 18, wherein the user's level of familiarity with the area is based at least in part on a frequency of the user's presence within the area and one or more types of activities in which the user engages while in the area.

20. The media of claim 18, wherein the user's level of familiarity with the area is based at least in part on a familiarity of the user with different categories of businesses in the area.

* * * * *